US012676849B2

(12) United States Patent
Edwards et al.

(10) Patent No.: US 12,676,849 B2
(45) Date of Patent: *Jul. 7, 2026

(54) ACCOUNT AUTHENTICATION USING SYNTHETIC MERCHANTS

(71) Applicant: Capital One Services, LLC, McLean, VA (US)

(72) Inventors: Joshua Edwards, Philadelphia, PA (US); Jenny Melendez, Falls Church, VA (US); Tyler Maiman, Melville, NY (US); David Septimus, New York, NY (US); Viraj Chaudhary, Katy, TX (US); Samuel Rapowitz, Roswell, GA (US); Daniel Miller, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 254 days.

This patent is subject to a terminal disclaimer.

(21) Appl. No.: 18/653,256

(22) Filed: May 2, 2024

(65) Prior Publication Data

US 2024/0283788 A1     Aug. 22, 2024

Related U.S. Application Data

(63) Continuation of application No. 17/354,053, filed on Jun. 22, 2021, now Pat. No. 12,010,110.

(51) Int. Cl.
*H04L 9/40*     (2022.01)
*G06F 21/62*     (2013.01)
(52) U.S. Cl.
CPC ........ *H04L 63/083* (2013.01); *G06F 21/6245* (2013.01); *H04L 63/107* (2013.01)

(58) Field of Classification Search
CPC . H04L 63/083; H04L 63/107; G06F 21/6245; G06F 21/31
See application file for complete search history.

(56) References Cited

U.S. PATENT DOCUMENTS 8,875,255 B1 * 10/2014 Dotan .................... G06F 21/31
713/182
10,182,023 B2 * 1/2019 Pycock ................ H04L 51/222
(Continued)

OTHER PUBLICATIONS

V. Bindschaedler and R. Shokri, "Synthesizing Plausible Privacy-Preserving Location Traces," 2016 IEEE Symposium on Security and Privacy (SP), San Jose, CA, USA, 2016, pp. 546-563 (Year: 2016).*

(Continued)

*Primary Examiner* — Catherine Thiaw
*Assistant Examiner* — Nega Woldemariam
(74) *Attorney, Agent, or Firm* — Banner & Witcoff, Ltd.

(57) ABSTRACT

Methods, systems, and apparatuses are described herein for improving computer authentication processes through the generation of synthetic merchants. A plurality of different real merchant names may be received. The plurality of different real merchant names may be processed to determine one or more name elements. A request for access to an account associated with a user may be received. Based on the one or more name elements, one or more synthetic merchant names may be generated. Based on the one or more synthetic merchant names, synthetic transaction data may then be generated. A synthetic authentication question may be generated and presented to a user. A candidate response to the synthetic authentication question may be received. Based on the candidate response, access to the account may be provided.

20 Claims, 5 Drawing Sheets

(56) References Cited

U.S. PATENT DOCUMENTS

| | | | | |
|---|---|---|---|---|
| 10,755,281 | B1 * | 8/2020 | Yip | G06Q 20/4016 |
| 11,720,709 | B1 * | 8/2023 | Kalaboukis | G06F 3/0482 |
| | | | | 726/26 |
| 2010/0114776 | A1 * | 5/2010 | Weller | G06Q 20/4016 |
| | | | | 705/325 |
| 2017/0048230 | A1 * | 2/2017 | Johansson | H04L 9/3271 |
| 2017/0078262 | A1 * | 3/2017 | Riddick | H04L 63/08 |
| 2019/0268331 | A1 * | 8/2019 | Toth | H04L 63/102 |
| 2020/0342879 | A1 * | 10/2020 | Carbune | G10L 25/51 |
| 2021/0099431 | A1 * | 4/2021 | Wasicek | H04L 63/0272 |
| 2021/0160281 | A1 * | 5/2021 | Hallaji | H04L 63/1491 |
| 2022/0407847 | A1 * | 12/2022 | Edwards | G06F 21/31 |
| 2024/0283788 | A1 * | 8/2024 | Edwards | H04L 63/083 |

OTHER PUBLICATIONS

Jun. 15, 2017, Laverty, "What Is User Enumeration?" <https://www.rapid7.com/blog/post/2017/06/15/about-user-enumeration/>, 15 pages.

Hacksplaining, "Avoiding User Enumeration," <<https://www.hacksplaining.com/prevention/user-enumeration>>, date of publication unknown but, prior to Jun. 7, 2021, 3 pages.

Apr. 2, 2020, Pankov, "Enumeration Attack Dangers," <<https://usa.kaspersky.com/blog/username-enumeration-attack/21337/>>, 2 pages.

Mar. 28, 2016, Betts, "What I Learned After Using an SSH Honeypot for 7 Days," INFRAGISTICS, <https://www.infragistics.com/community/blogs/b/torrey-betts/posts/what-i-learned-after-using-an-ssh-honeypot-for-7-days>>, 8 pages.

Nov. 14, 2022—(EP) Extended European Search Report—Appl No. 22180572.

\* cited by examiner

Northwest Feed & Seed
Jin's Bubble Tea
Corleone Italian Cuisine
Spencer Street Coffee Real Merchant Names
(501)

| Jin Spencer | Corleone Spencer | Feed & Seed Bubble Tea Italian Cuisine Coffee |
|---|---|---|
| First Names Category (503a) | Last Names Category (503b) | Good/Service Identifier Category (503c) |

Name Elements
(502)

Spencer's Feed & Seed
Corleone Coffee

Synthetic Merchant Names
(504)

Did you shop at SPENCER'S FEED & SEED last week?

| YES | NO |

Synthetic Authentication Question
(505)

FIG. 5

ACCOUNT AUTHENTICATION USING SYNTHETIC MERCHANTS

CROSS REFERENCE TO RELATED APPLICATIONS

This application is a continuation of U.S. application Ser. No. 17/354,053, entitled "Account Authentication Using Synthetic Merchants," and filed Jun. 22, 2021. The contents of the above listed application is expressly incorporated herein by reference in its entirety for any and all non-limiting purposes.

FIELD OF USE

Aspects of the disclosure relate generally to account security. More specifically, aspects of the disclosure may provide for improvements in the method in which authentication questions are generated through the use of synthetic transactions involving synthetic merchants.

BACKGROUND

As part of determining whether to grant a user access to content (e.g., as part of determining whether to provide a caller access to a telephone system that provides banking information), a user of the user device might be prompted with one or more authentication questions. Such questions might relate to, for example, a password of the user, a personal identification number (PIN) of the user, or the like. Those questions might additionally and/or alternatively be generated based on personal information of the user. For example, when setting up an account, a user might provide a variety of answers to predetermined questions (e.g., "Where was your father born?," "Who was your best friend in high school?"), and those questions might be presented to the user as part of an authentication process. As another example, a commercially-available database of personal information might be queried to determine personal information for a user (e.g., their birthdate, birth state, etc.), and that information might be used to generate an authentication question (e.g., "Where were you born, and in what year?").

As part of authenticating a computing device, information about financial transactions conducted by a user of that computing device might be used to generate authentication questions as well. For example, a user might be asked questions about one or more transactions conducted by the user in the past (e.g., "Where did you get coffee yesterday?," "How much did you spend on coffee yesterday?," or the like). Such questions might prompt a user to provide a textual answer (e.g., by inputting an answer in a text field), to select one of a plurality of answers (e.g., select a single correct answer from a plurality of candidate answers), or the like. In some instances, the user might be asked about transactions that they did not conduct. For example, a computing device might generate a synthetic transaction (that is, a fake transaction that was never conducted by a user), and ask a user to confirm whether or not they conducted that transaction. Authentication questions can be significantly more useful when they can be based on either real transactions or synthetic transactions: after all, if every question related to a real transaction, a nefarious user could use personal knowledge of a legitimate user to guess the answer, and/or the nefarious user might be able to glean personal information about the legitimate user.

One risk in presenting authentication questions based on real merchants (whether in the form of a question about a real transaction or in the form of a synthetic transaction) is that information about such merchants might be used to guess the answer to an authentication question. For example, it might be easy to predict that the average American shops at their local grocery store at least once a week. As another example, knowledge that a recent local store has closed might allow an unauthorized user to guess that a user likely has not shopped there recently. This can make synthetic authentication questions particularly weak, especially where they are premised on synthetic transactions which are not believable. For example, a synthetic transaction relating to a purchase of coffee at 5:00 PM on Wednesday and from a real-world coffee shop might be unbelievable because the real-world coffee shop might not be open on Wednesdays.

Aspects described herein may address these and other problems, and generally improve the safety of financial accounts and computer transaction systems by generating synthetic merchants that are based on real merchants and using those synthetic merchants to generate synthetic authentication questions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for improvements in the manner in which authentication questions are used to control access to accounts. The improvements described herein relate to the generation of synthetic merchants which emulate properties of real-world merchants, allowing synthetic transactions generated based on these synthetic merchants to appear more realistic. In turn, synthetic authentication questions premised on these synthetic transactions better protect accounts from unauthorized access: while a legitimate user (e.g., one permitted to access an account) might still be able to easily identify that they did not conduct a transaction at a particular merchant, an unauthorized user (e.g., a malicious user trying to gain unauthorized access to an account) might have a harder time identifying whether the authentication question relates to a synthetic transaction. As will be described in greater detail below, this process is effectuated by identifying name elements of real-world merchant names, which might allow for synthetic merchants to be generated in a believable manner.

More particularly, some aspects described herein may provide for a computing device that may receive, from a merchants database, a plurality of different real merchant names. The computing device may process the plurality of different real merchant names to determine one or more name elements. The computing device may receive, from a user device, a request for access to an account associated with a user. The computing device may generate, based on the one or more name elements, one or more synthetic merchant names. The computing device may generate, based on the one or more synthetic merchant names, synthetic transaction data. The computing device may generate, based on the synthetic transaction data, a synthetic authentication question. The computing device may cause presentation, to the user, of the synthetic authentication question. The computing device may receive a candidate response to the synthetic authentication question; and provide, based on the candidate response, the user device access to the account.

According to some embodiments, the computing device may generate the one or more synthetic merchant names by identifying a location associated with the account and selecting, based on the location, at least one of the one or more name elements that corresponds to the location. The computing device may generate the one or more synthetic merchant names by selecting a first name element of the one or more name elements that corresponds to a type of cuisine and selecting, based on the type of cuisine, a second name element of the one or more name elements that corresponds to a first name or surname. The computing device may generate the one or more synthetic merchant names by providing, as input to a trained machine learning model, the one or more synthetic merchant names. The trained machine learning model may be trained, based on tagged training data comprising the plurality of different real merchant names, to predict a believability of merchant names. The computing device may then receive, as output from the trained machine learning model, a predicted believability of the one or more synthetic merchant names. The computing device may generate the one or more synthetic merchant names based on comparing the one or more synthetic merchant names to the plurality of different real merchant names. The computing device may process the plurality of different real merchant names to determine the one or more name elements by training a machine learning model to identify name elements by providing the machine learning model tagged data comprising a first portion of the plurality of different real merchant names, providing, as input to the trained machine learning model, a second portion of the plurality of different real merchant names, and receiving, as output from the trained machine learning model, at least a portion of the one or more name elements. The one or more name elements may comprise one or more of: first names; surnames; geographical references; or indications of goods or services.

Corresponding method, apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 5 depicts examples of real merchant names, name elements, synthetic merchant names, and a synthetic authentication question.

DETAILED DESCRIPTION

Figure 1:
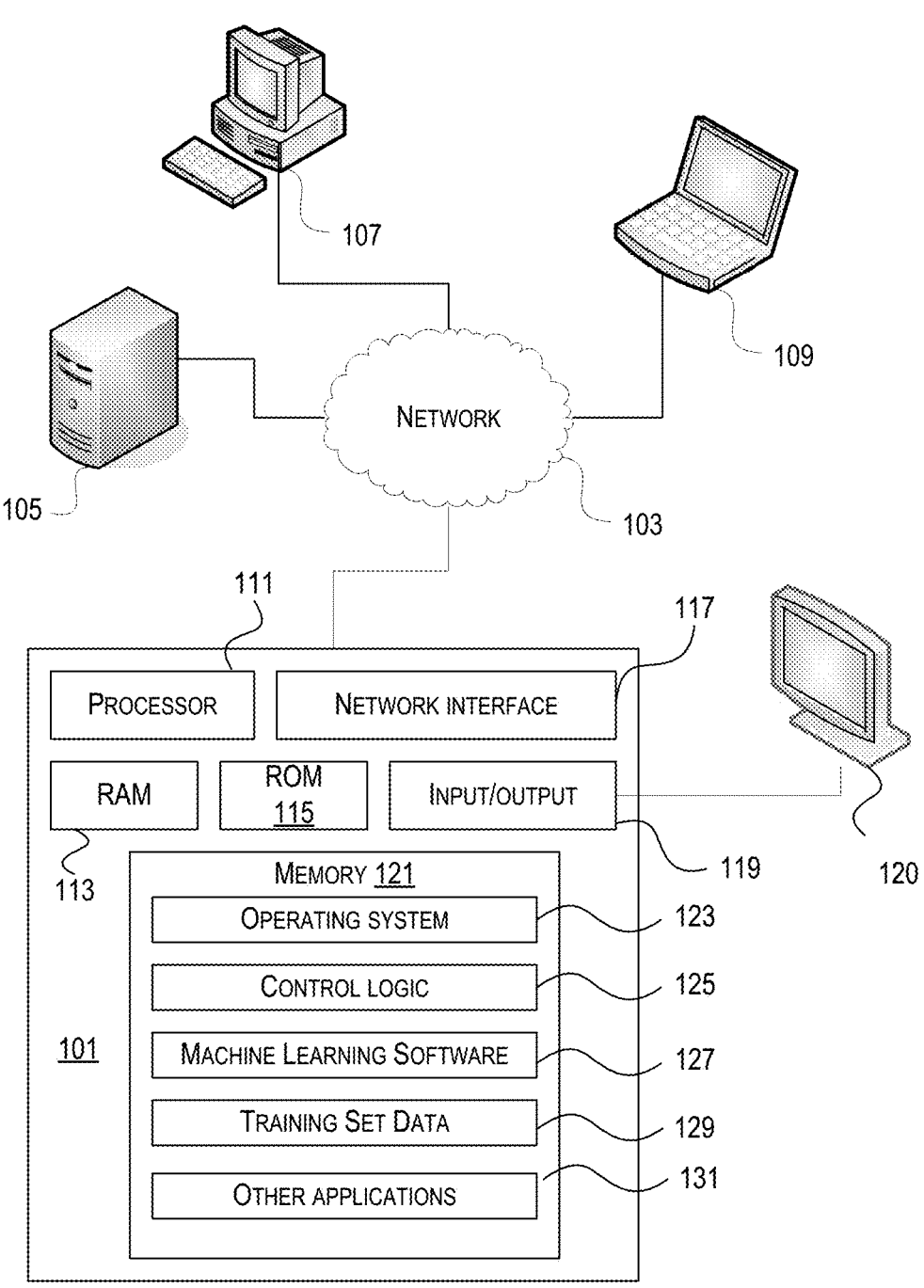
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving authentication questions used during an authentication process. In particular, the process depicted herein may generate synthetic merchants which may be used for synthetic transactions upon which authentication questions may be based, thereby significantly improving the security of computer authentication processes.

As an example of one problem addressed by the current disclosure, an authentication system might, as part of an authentication process for accessing an account, generate a synthetic transaction (e.g., a fake transaction conducted at a real merchant for a real item), and then provide a user a synthetic authentication question based on that synthetic transaction (e.g., ask a user whether they conducted the synthetic transaction). But the real merchant may have in fact permanently closed in the last week. In such a circumstance, a malicious user might be able to guess the answer to the question based on external facts alone. This can be a significant security hole under certain circumstances, particularly where a malicious user might have ready access to search engines which allow such research.

Aspects described herein improve the functioning of computers by improving the way in which computers provide authentication questions and protect computer-implemented accounts. The speed and processing complexity of computing devices allows them to present more complicated authentications than ever before, which advantageously can improve the security of sensitive account information. That said, the algorithms with which authentication questions are generated can have security holes, which might render those authentication questions undesirably vulnerable to exploitation. Such exploitation can result in the illegitimate use and abuse of computer resources. The processes described herein improve this process by analyzing data reflecting merchant names and generating synthetic merchant names using, e.g., natural language processing techniques, thereby improving the safety of authentication questions by generating synthetic transactions using realistic, but also synthetic, merchants. Such steps cannot be performed by a user and/or via pen and paper at least because the problem is fundamentally rooted in computing processes, involves a significantly complex amount of data and word processing, and requires steps (e.g., authenticating computerized requests for access) which cannot be performed by a human being.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
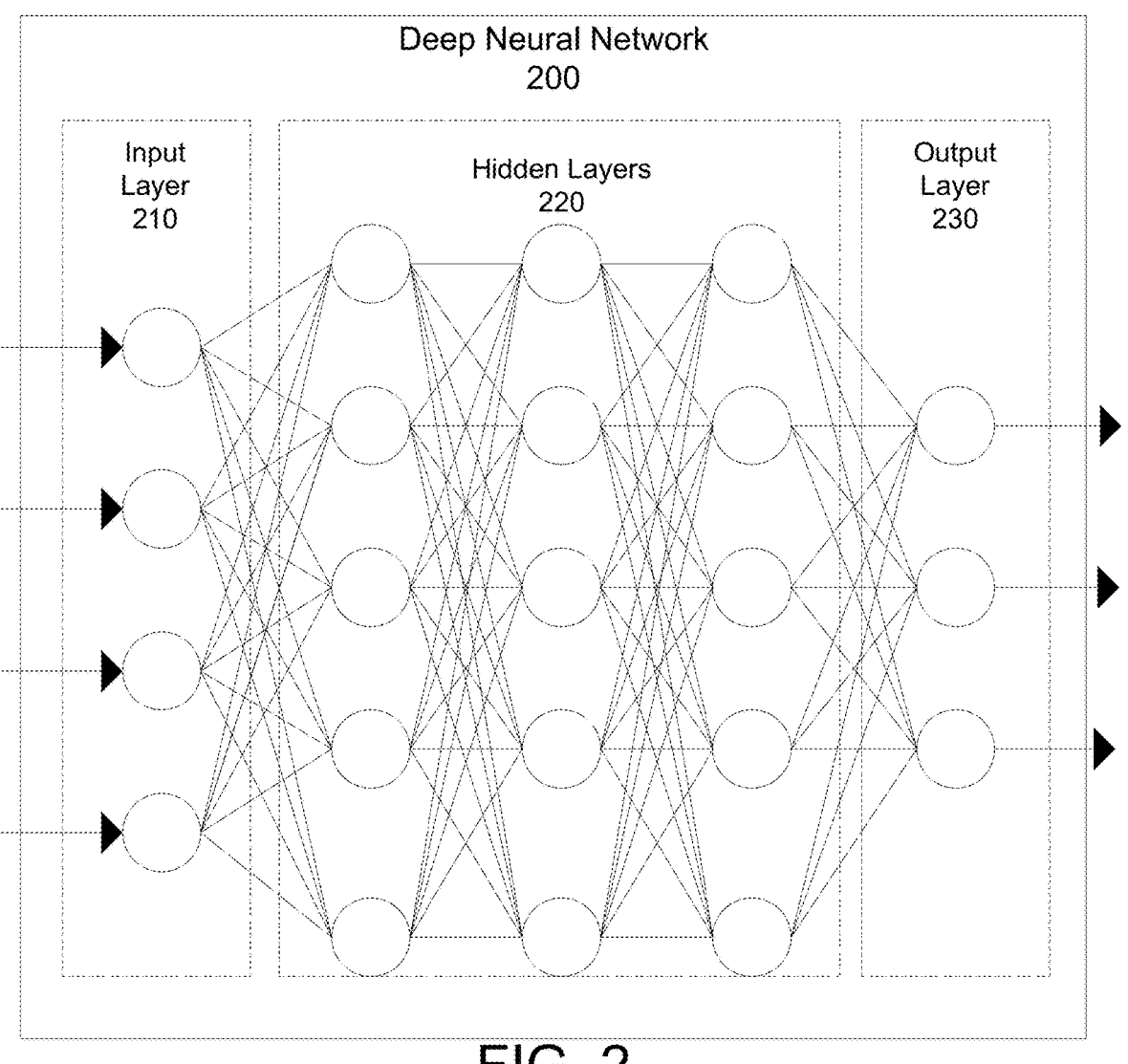
FIG. 2 depicts an example deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
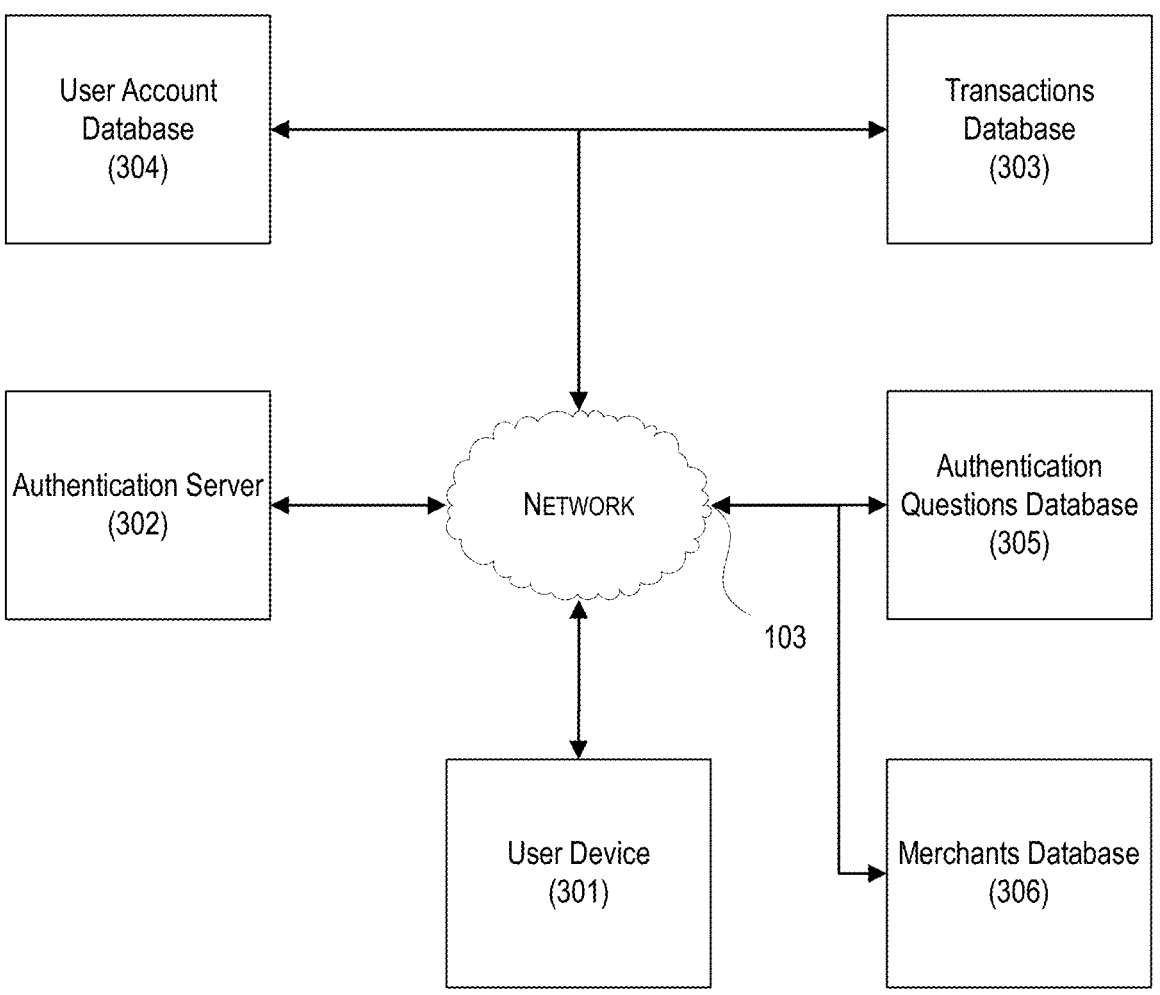
FIG. 3 depicts a system comprising different computing devices that may be used in implementing one or more aspects of the disclosure in accordance with one or more illustrative aspects discussed herein.

FIG. 3 depicts a system for authenticating a user device 301. The user device 301 is shown as connected, via the network 103, to an authentication server 302, a transactions database 303, a user account database 304, an authentication questions database 305, and a merchants database 306. The network 103 may be the same or similar as the network 103 of FIG. 1. Each of the user device 301, the authentication server 302, the transactions database 303, the user account database 304, the authentication questions database 305, and/or the merchants database 306 may be one or more computing devices, such as a computing device comprising one or more processors and memory storing instructions that, when executed by the one or more processors, perform one or more steps as described further herein. For example, any of those devices might be the same or similar as the computing devices 101, 105, 107, and 109 of FIG. 1.

As part of an authentication process, the user device 301 might communicate, via the network 103, to access the authentication server 302 to request access (e.g., to a user account). The user device 301 shown here might be a smartphone, laptop, or the like, and the nature of the communications between the two might be via the Internet, a phone call, or the like. For example, the user device 301 might access a website associated with the authentication server 302, and the user device 301 might provide (e.g., over the Internet and by filling out an online form) candidate authentication credentials to that website. The authentication server 302 may then determine whether the authentication credentials are valid. For example, the authentication server 302 might compare the candidate authentication credentials received from the user device 301 with authentication credentials stored by the user account database 304. In the case where the communication is telephonic, the user device 301 need not be a computing device, but might be, e.g., a conventional telephone.

The user account database 304 may store information about one or more user accounts, such as a username, password, demographic data about a user of the account, or the like. For example, as part of creating an account, a user might provide a username, a password, and/or one or more answers to predetermined authentication questions (e.g., "What is the name of your childhood dog?"), and this information might be stored by the user account database 304. The authentication server 302 might use this data to generate authentication questions. The user account database 304 might store demographic data about a user, such as their age, gender, location, occupation, education level, income level, and/or the like.

The transactions database 303 might comprise data relating to one or more transactions conducted by one or more financial accounts associated with a first organization. For example, the transactions database 303 might maintain all or portions of a general ledger for various financial accounts associated with one or more users at a particular financial institution. The data stored by the transactions database 303 may indicate one or more merchants (e.g., where funds were spent), an amount spent (e.g., in one or more currencies), a date and/or time (e.g., when funds were spent), or the like. The data stored by the transactions database 303 might be generated based on one or more transactions conducted by one or more users. For example, a new transaction entry might be stored in the transactions database 303 based on a user purchasing an item at a store online and/or in a physical store. As another example, a new transaction entry might be stored in the transactions database 303 based on a recurring charge (e.g., a subscription fee) being charged to a financial account. As will be described further below, synthetic transactions might be based, in whole or in part, on legitimate transactions reflected in data stored by the transactions database 303. In this way, the synthetic transactions might better emulate real transactions.

The account data stored by the user account database 304 and the transactions database 303 may, but need not be related. For example, the account data stored by the user account database 304 might correspond to a user account for a bank website, whereas the financial account data stored by the transactions database 303 might be for a variety of financial accounts (e.g., credit cards, checking accounts, savings accounts) managed by the bank. As such, a single user account might provide access to one or more different financial accounts, and the accounts need not be the same. For example, a user account might be identified by a username and/or password combination, whereas a financial account might be identified using a unique number or series of characters.

The authentication questions database 305 may comprise data which enables the authentication server 302 to present authentication questions. An authentication question may be any question presented to one or more users to determine whether the user is authorized to access an account. For example, the question might be related to personal information about the user (e.g., as reflected by data stored in the user account database 304), might be related to past transactions of the user (e.g., as reflected by data stored by the transactions database 303), or the like. The authentication questions database 305 might comprise data for one or more templates which may be used to generate an authentication question based on real information (e.g., from the user account database 304 and/or the transactions database 303) and/or based on synthetic information (e.g., synthetic transactions which have been randomly generated and which do not reflect real transactions). The authentication questions database 305 might additionally and/or alternatively comprise one or more static authentication questions, such as an authentication question that is used for a wide variety of users (e.g., "What is your account number?"). An authentication question might correspond to a synthetic transaction (e.g., a transaction which never occurred). For example, a synthetic transaction indicating a $10 purchase at a coffee shop on Wednesday might be randomly generated, and the authentication question could be, e.g., "Where did you spent $10 last Wednesday?," "How much did you spend at the coffee shop last Wednesday?," or the like. In all such questions, the correct answer might indicate that the user never conducted the transaction. As part of generating authentication questions based on synthetic transactions, organizations might be randomly selected from a list of organizations stored by the merchants database 306. Additionally and/or alternatively, as part of generating such authentication questions based on synthetic transactions, real transactions (e.g., as stored in the transactions database 303) might be analyzed. In this manner, real transactions might be used to make synthetic transactions appear more realistic. The authentication questions database 305 might additionally and/or alternatively comprise historical authentication questions. For example, the authentication questions database 305 might comprise code that, when executed, randomly generates an authentication question, then stores that randomly-generated authentication question for use with other users.

The authentication questions stored in the authentication questions database 305 may be associated with varying levels of difficulty. For example, straightforward answers that should be easily answered by a user (e.g., "What is your mother's maiden name?") might be considered easy questions, whereas complicated answers that require a user to remember past transactions (e.g., "How much did you spend on coffee yesterday?") might be considered difficult questions.

The merchants database 306 might store data relating to one or more merchants, including indications (e.g., names) of merchants, aliases of the merchants, and the like. That data might be used to generate authentication questions that comprise both correct answers (e.g., based on data from the transactions database 303 indicating one or more merchants where a user has in fact conducted a transaction) and synthetic transactions (e.g., based on data from the merchants database 306, which might be randomly-selected merchants where a user has not conducted a transaction). For example, a computing device might, as part of randomly generating a synthetic transaction using instructions provided by the authentication questions database 305, generate a synthetic transaction by querying the merchants database 306 for a list of merchants, then removing, from that list, organizations represented in the data stored by the transactions database 303.

Having discussed several examples of computing devices which may be used to implement some aspects as discussed further below, discussion will now turn to a method for use of synthetic merchants during authentication.

Figure 4:
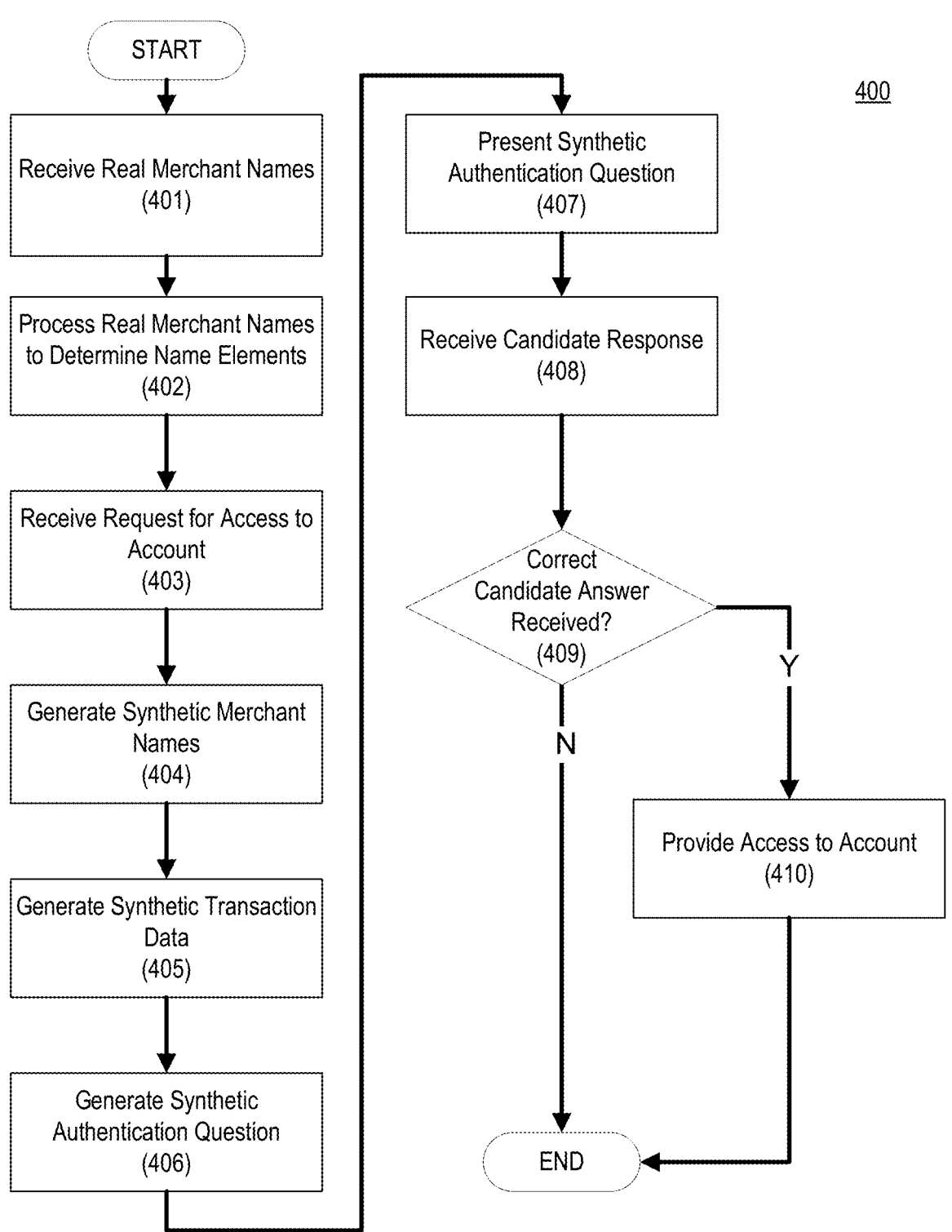
FIG. 4 depicts a flow chart comprising steps which may be performed for generating synthetic merchants.

FIG. 4 illustrates an example method 400 for generating synthetic merchants and presenting authentication questions in accordance with one or more aspects described herein. The method 400 may be implemented by a suitable computing system, as described further herein. For example, the method 400 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 4. The method 400 may be implemented in suitable program instructions, such as in machine learning software 127, and may operate on a suitable training set, such as training set data 129. The method 400 may be implemented by computer-readable media that stores instructions that, when executed, cause performance of all or portions of the method 400. The steps shown in the method 400 are illustrative, and may be re-arranged or otherwise modified as desired.

In step 401, the computing device may receive real merchant names. Merchant names may comprise any indication of a merchant, such as a formal name of the merchant (e.g., "Joe's Fish LLC"), a common name of the merchant (e.g., "Joe's Fish"), a slang term associated with the merchant (e.g., "Joe's"), or the like. The merchant names may be retrieved from a database, such as the merchants database 306. For example, the computing device may receive, from a merchants database, a plurality of different real merchant names. The database (e.g., the merchants database 306) may be populated from a variety of different sources, such as based on transaction records stored by the transactions database 303. Accordingly, the real merchant names retrieved in step 401 might correspond to real merchants where at least one user has conducted a transaction. Accordingly, receiving real merchant names may comprise receiving merchant names corresponding to transactions which have been conducted within a particular time period. For instance, the computing device may receive, from a merchants database, a plurality of different real merchant names corresponding to transactions (e.g., as stored by the transactions database 303) that have been conducted in the last month. In this manner, older (e.g., potentially closed) merchants might not be included in the real merchant names received in step 401.

In step 402, the computing device may process the real merchant names to determine name elements. Processing the real merchant names may comprise taking one or more processing steps to identify one or more portions of the merchant names. For example, the computing device may process the plurality of different real merchant names to determine one or more name elements. Name elements may comprise one or more portions of any identifier of a merchant. For example, name elements may comprise first names, surnames, geographical references, indications of goods and/or services, or the like. For example, the name "Joe's Crab Shack LLC" might comprise four different name elements: a first name ("Joe"), an indication of a good and/or service ("Crab"), a word commonly associated with merchants in the category ("Shack," as might be used with restaurants in a particular geographic area, such as restaurants in a beachside town), and a business designation ("LLC"). As another example, the merchant name "Northwest Feed & Seed" could be divided into two name elements: a geographic designation ("Northwest") and an indication of a good and/or service ("Feed & Seed").

Processing the name elements might comprise determining whether the name elements correspond to a geographical region. Name elements might be particular to a geographical region. For example, while the term "Northwest" might be broadly used in a variety of different geographical locales, the term "New York" might only be used in New York-based restaurants. As such, it may be undesirable to use the geographic region identifier "New York" for authentication questions for, e.g., a user in California. To identify such geographically-limited terms, a list of geographically-specific terms might be maintained in, e.g., a database, and processing the name elements might comprise determining whether one or more portions of a merchant name correspond to an element of the list of geographically-specific terms.

Processing the name elements might comprise determining whether the name elements correspond to a good and/or service. An indication of a good and/or service might indicate, directly or indirectly, a good and/or service. For example, the merchant name "Corleone Coffee" might suggest that coffee is available because the word "Coffee" is in the name. As another example, the merchant name "Joe's Bakery" might suggest that baked goods are available, because the word "Bakery" is associated with baked goods. To identify terms suggesting goods and/or services, a list of such terms might be maintained in, e.g., a database, and processing the name elements might comprise determining whether one or more portions of a merchant name are suggestive of a good and/or service.

Processing the name elements might comprise determining whether the name elements correspond to a name of a person. It is not uncommon for merchant names to contain all or portions of a first, middle, or last name. In some instances, such names might have some relevance to the goods and/or services provided: for example, an Italian restaurant might use a name that sounds Italian, whereas a Spanish restaurant might use a name that sounds Spanish. As such, it may be undesirable to use a proper name in authentication question where the good and/or service involved is distinctly different from that name. As just one example, an authentication question such as "Did you buy a hamburger from Jintaro's Restaurant?" might be readily identified as synthetic. To identify such name-related terms, a list of name-related terms might be maintained in, e.g., a database, and processing the name elements might comprise determining whether one or more portions of a merchant name correspond to a first name, last name, middle name, or the like.

Processing the name elements might comprise determining connections between different name elements. In some instances, name elements in different categories might correspond to one another. For example, certain proper names (e.g., "Lee") might frequently be associated with certain words evocative of goods and/or services (e.g., "Asian Cuisine," "Vietnamese Food," "Korean Food"). As another example, certain geographically-relevant terms (e.g., "Maine," "Boston") might frequently be associated with certain words evocative of goods and/or services (e.g., "Seafood," "Beer").

Processing the real merchant names may comprise use of a machine learning model. A machine learning model (e.g., as implemented via the deep neural network 200 and/or the machine learning software 127) may be trained to identify name elements. To train the machine learning model in this manner, the machine learning model may be provided tagged data comprising a first portion of a plurality of different real merchant names. For example, the machine learning model might be provided a set of 100 different merchant names, with each merchant name being pre-tagged to indicate, for example, which portions of the merchant names correspond to human names, geographical regions, goods and/or services, or the like. Such tagging might be performed manually by a human. Then, the computing device may provide, as input to the trained machine learning model, a second portion of the plurality of different real merchant names. This second portion of the plurality of different real merchant names need not be tagged, and thus this input might prompt the trained machine learning model to tag one or more portions of each real merchant name with an indication of whether it corresponds to a name element. The computing device may then receive, as output from the trained machine learning model, at least a portion of the one or more name elements. For example, the output might indicate, for each of the second portion of the plurality of different real merchant names, whether a word and/or phrase corresponds to a human name, a geographic region, a good and/or service, or the like.

In step 403, the computing device may receive a request for access to an account. For example, the computing device may receive, from a user device, a request for access to an account associated with a user. The request may be associated with access, by a user, to a website, an application, or the like. The request may additionally and/or alternatively be associated with, for example, a user device calling into an Interactive Voice Response (IVR) system or similar telephone response system. For example, the computing device may receive an indication of a request for access to an account responsive to a user accessing a log-in page, calling a specific telephone number, or the like. The request may specifically identify an account via, for example, an account number, a username, or the like. For example, a user might call an IVR system and be identified (e.g., using caller ID) by their telephone number, which might be used to query the user account database 304 for a corresponding account.

In step 404, the computing device may generate one or more synthetic merchant names. Generating the synthetic merchant names might be based on the name elements determined in step 402. For example, the computing device may generate, based on the one or more name elements, one or more synthetic merchant names. The name elements might be used in combination. For example, generating the one or more synthetic merchant name might comprise randomly selecting a name (e.g., "Joe") and an indication of goods and/or services (e.g., "Coffee") to create a synthetic merchant name (e.g., "Joe's Coffee"). With that said, certain ordering rules might be implemented to ensure that the synthetic merchant name is combined in a believable name. As many merchant names involve a possessive first and/or last name and an indication of goods and/or services, the format "X's Y" might be used to generate synthetic merchant names such as "Joe's Coffee" and "Bob's Bagels" rather than fake-sounding names such as, e.g., "Coffee Joe" or "Bagel's Bob." As many merchant names involve a geographic indication and an indication of goods and/or services, the former "X Y" might be used to generate synthetic merchant names such as "Northwest Coffee" and "Main Street Bagels" rather than somewhat more unbelievable names such as, e.g., "Coffee Northwest" or "Bagels Main Street."

Generating the one or more synthetic merchant names may be based on comparing the one or more synthetic merchant names to a plurality of different real merchant names. Because the name elements correspond to various real merchants, and because many name elements (e.g., "Main Street," "Coffee") might be commonly used, it is possible that a synthetic merchant name might correspond to a real merchant. This might be undesirable at least because it might confuse a legitimate user: if an authentication question is provided that uses a synthetic merchant name (e.g., "Joe's Coffee"), but that synthetic merchant name corresponds to a real merchant where the legitimate user has shopped (e.g., a real store called "Joe's Coffee" where the user has shopped in the past), the user might be confused and answer incorrectly. To determine whether the one or more synthetic merchant names correspond to a real merchant name, the one or more synthetic merchant names might be compared to real merchant names stored by the merchants database 306 and/or merchant names reflected in transactions indicated by data stored by the transactions database 303.

Generating the one or more synthetic merchant names may be based on a location associated with the account. Accounts might be associated with a particular location, such as a home address of a user, a city (e.g., where a user lives), or the like. Accordingly, one or more synthetic merchant names might be generated based on a location of the account so as to make the one or more synthetic merchant names more believable. In this manner, the computing device may identify a location associated with the account and select, based on the location, at least one of the one or more name elements that corresponds to the location. For example, for an account associated with Brooklyn, name elements such as "New York," "Brooklyn," and "Manhattan" might be selected, such that the one or more synthetic merchant names might comprise "Brooklyn Bagels" but might not necessarily include "Los Angeles Bagels." Based on the geographical region of the account, other related name elements might be selected, and/or one or more name elements might not be used. For example, the good and/or service designation "Sushi" might be more believable if in New York City (e.g., "Manhattan Sushi"), but not necessarily when used in conjunction with a small town name (e.g., "Newton Sushi"). As another example, the good and/or service designation "BBQ" might be used more in conjunction with geographical regions famous for barbeque (e.g., "Kentucky") rather than regions not particularly known for barbeque (e.g., "Maine").

Generating the one or more synthetic merchant names may be based on a type of good and/or service. A name element indicating a good and/or service might be selected (e.g., "Car Repair," "Bagels," "Grocery," or the like), and other name elements might be selected based on the type of good and/or service selected. This might operate to improve the believability of the synthetic merchant name(s) generated. For instance, this process might relate to a type of cuisine. The computing device may select a first name element of the one or more name elements that corresponds to a type of cuisine (e.g., "Italian"), and then select, based on the type of cuisine, a second name element of the one or more name elements that corresponds to a first name or surname (e.g., "Corleone"). The computing device may select a first name element of the one or more name elements that corresponds to a type of service (e.g., "Bail Bonds"), and then select, based on the type of service, a second name element of the one or more name elements that corresponds to a geographical location (e.g., "Courthouse Square").

Generating the one or more synthetic merchant names may comprise use of a machine learning model. A machine learning model (e.g., as implemented via the deep neural network 200 and/or the machine learning software 127) may be trained, based on tagged training data comprising the plurality of different real merchant names and/or false merchant names, to predict a believability of merchant names. The tagged training data may comprise, for example, a list of fake and real merchant names, along with a designation of whether each of the list is real or fake. In this manner, the machine learning model might learn which aspects of merchant names make them more or less real-sounding based on learning to identify which merchant names are, in fact, real. The computing device may then provide, as input to a trained machine learning model, the one or more synthetic merchant names. This input might prompt the trained machine learning model to predict whether the one or more synthetic merchant names are real or not. The computing device may then receive, as output from the trained machine learning model, a predicted believability of the one or more synthetic merchant names. In this manner, the trained machine learning model might be trained to detect real merchant names amongst a plurality of real or fake merchant names, and this training might be used to see if the trained machine learning model can be, in effect, tricked by the generated synthetic merchant name.

In step 405, the computing device may generate synthetic transaction data. Synthetic transaction data might correspond to a computer-generated transaction which appears to be real but which was not conducted by a user. The synthetic transaction data might indicate a transaction associated with one or more of the synthetic merchant names generated in step 404. For example, the computing device may generate, based on the one or more synthetic merchant names, synthetic transaction data. The synthetic transaction data might comprise simulated goods and/or services purchased at the merchant, a time and/or date of the synthetic transaction, or the like. In this manner, the synthetic transaction data might mimic real transaction data (e.g., as stored by the transactions database 303), albeit being false and related to a synthetic merchant (e.g., the synthetic merchant name generated in step 404). It may be desirable for the synthetic transaction data to be easily identified as synthetic by a legitimate user, but to have the appearance of being genuine to an unauthorized user. For example, the amount of the transaction involved, the synthetic merchant name, and/or other elements of the synthetic transaction data might be easily identified by a legitimate user as synthetic because, for example, they do not recognize the merchant, the amount, the goods and/or services purchased, or the like.

In step 406, the computing device may generate a synthetic authentication question. A synthetic authentication question might be an authentication question relating to a synthetic transaction, such as the synthetic transaction data generated in step 405. For example, the computing device may generate, based on the synthetic transaction data, a synthetic authentication question. In this manner, the authentication question might ask a user, e.g., whether or not they conducted the synthetic transaction. It may be desirable for the synthetic authentication question to be easily identified as synthetic by a legitimate user, but to have the appearance of being genuine to an unauthorized user.

A synthetic authentication question may have a correct answer and one or more incorrect answers. For example, if the question inquires as to whether or not a user conducted a synthetic transaction, the answer should be "no," as the transaction is synthetic (and thus not real). In turn, in that example, the incorrect answer might be "yes." As another example, the synthetic authentication question might ask where a user recently shopped (e.g., "Where did you shop last week?"), with one answer being a genuine answer (e.g., corresponding to a transaction stored by the transactions database 303) and one or more other answers corresponding to synthetic merchants (e.g., as determined in step 404).

As an example of steps 404 through 406, the computing device might, using the name elements determined in step 402, generate a synthetic merchant name ("Joe's Coffee"). Then, as part of step 405, the computing device might generate synthetic transaction data using that synthetic merchant name (e.g., a $4.99 purchase of coffee at Joe's Coffee on Wednesday at 2:00 PM EST). Then, as part of step 406, the computing device might generate a synthetic authentication question based on that synthetic transaction data (e.g., "Did you spend approximately $5 at Joe's Coffee on Wednesday?").

In step 407, the computing device may present the synthetic authentication question. Presenting the synthetic authentication question may comprise causing one or more computing devices to display and/or otherwise output the authentication question. For example, the computing device may cause presentation, to the user, of the synthetic authentication question. Such presentation might comprise providing the authentication question in a text format (e.g., in text on a website), in an audio format (e.g., over a telephone call), or the like.

In step 408, the computing device may receive a candidate response to the synthetic authentication question. A candidate response may be any indication of a response, by a user, to the authentication question presented in step 407. For example, where an authentication question comprises one or more answers, the candidate response might comprise a selection of at least one of the one or more answers. As another example, in the case of a telephone call, the candidate response might comprise an oral response to an authentication question provided using a text-to-speech system over the call.

In step 409, the computing device may determine whether the candidate answer received in step 408 is correct. Determining whether the candidate answer is correct may comprise comparing the answer to the correct answer determined as part of generating the synthetic authentication question in step 406. If the candidate answer is correct, the method 400 proceeds to step 410. Otherwise, the method 400 ends.

In step 410, the computing device may provide access to the account. For example, the computing device may provide, based on the candidate response, the user device access to the account. Access to the account might be provided by, e.g., providing a user device access to a protected portion of a website, transmitting confidential data to a user device, allowing a user to request, modify, and/or receive personal data (e.g., from the user account database 304 and/or the transactions database 303), or the like.

FIG. 5 depicts real merchant names 501, name elements 502, synthetic merchant names 504, and a synthetic authentication question 505. These elements are representations of various steps in the method 400 depicted in FIG. 4, such as those depicted with respect to steps 401 through 406 of the method 400.

The real merchant names 501 shown in FIG. 5 show an example of four different real-world merchant names. These real-world merchant names might correspond to merchants where transactions have recently been conducted, as reflected by data stored in the transactions database 303. As reflected by the real-world merchant names 501, the names need not correspond to the same location, good and/or service, or the like. In some instances, it may be desirable for the real-world merchant names 501 to reflect a broad and/or random set of merchant names across a wide variety of geographical locations, merchant categories, or the like.

The name elements 502 show various name elements that have been determined based on processing the real merchant names 501. In this manner, the name elements 502 might be the result of the processing discussed with respect to step 402 of FIG. 4. The name elements have been categorized into three different categories: a first names category 503*a*, a last names category 503*b*, and a good/service identifier category 503*c*. In this way, the name elements 502 might be divided to indicate which portions of the real merchant names 501 correspond to different types of name elements.

The synthetic merchant names 504 comprise two different synthetic merchant names, and each of these two different synthetic merchant names have been generated based on the name elements 502. The synthetic merchant names 504 may be output as the result of step 404 of FIG. 4. As shown in FIG. 5, the first name "Spencer," originally used for a coffee shop, has been repurposed to create the synthetic merchant name "Spencer's Feed & Seed." Moreover, as shown in FIG. 5, the name "Corleone," originally used for Italian cuisine, has been repurposed to create the synthetic merchant name "Corleone Coffee."

The synthetic authentication question 505 inquires whether a user has shopped at "Spencer's Feed & Seed" last week. The synthetic authentication question 505 might be output corresponding to all or portions of steps 406 and 407 of FIG. 4. The synthetic authentication question asks whether a user has shopped at one of the synthetic merchant names 504, such that the correct answer might be "no." After all, in this instance, the merchant does not exist, and was computer-generated for the purposes of the authentication question.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
one or more processors; and
memory storing instructions that, when executed by the one or more processors, cause the computing device to:
receive, from a merchants database, a plurality of different real merchant names;
process the plurality of different real merchant names to determine one or more name elements;
receive, from a user device, a request for access to an account associated with a user;
generate, based on the one or more name elements and based on a location associated with the account, one or more synthetic merchant names by:
providing, as input to a trained machine learning model, the one or more synthetic merchant names, wherein the trained machine learning model is trained to predict a believability of merchant names; and
receiving, as output from the trained machine learning model, a predicted believability of the one or more synthetic merchant names;
generate, based on the one or more synthetic merchant names, synthetic transaction data that indicates a financial transaction conducted by the account and associated with at least one of the one or more synthetic merchant names;
generate, based on the synthetic transaction data, a synthetic authentication question; and
provide the user device access to the account based on a response to the synthetic authentication question.

2. The computing device of claim 1, wherein the instructions, when executed by the one or more processors, cause the computing device to generate the one or more synthetic merchant names by causing the computing device to:
identify the location associated with the account; and
select, based on the location, at least one of the one or more name elements that corresponds to the location.

3. The computing device of claim 1, wherein the instructions, when executed by the one or more processors, cause the computing device to generate the one or more synthetic merchant names by causing the computing device to:
select a first name element of the one or more name elements that corresponds to a type of cuisine; and
select, based on the type of cuisine, a second name element of the one or more name elements that corresponds to a first name or surname.

4. The computing device of claim 1, wherein the trained machine learning model is trained to predict the believability of merchant names based on tagged training data comprising the plurality of different real merchant names.

5. The computing device of claim 1, wherein the instructions, when executed by the one or more processors, cause the computing device to generate the one or more synthetic merchant names based on comparing the one or more synthetic merchant names to the plurality of different real merchant names.

6. The computing device of claim 1, wherein the instructions, when executed by the one or more processors, cause the computing device to process the plurality of different real merchant names to determine the one or more name elements by causing the computing device to:

train a machine learning model to identify name elements by providing the machine learning model tagged data comprising a first portion of the plurality of different real merchant names;

provide, as input to the trained machine learning model, a second portion of the plurality of different real merchant names; and receive, as output from the trained machine learning model, at least a portion of the one or more name elements.

7. The computing device of claim 1, wherein the one or more name elements comprise one or more of:

first names;

surnames;

geographical references; or indications of goods or services.

8. A method comprising:

receiving, by a computing device and from a merchants database, a plurality of different real merchant names;

processing, by the computing device, the plurality of different real merchant names to determine one or more name elements;

receiving, by the computing device and from a user device, a request for access to an account associated with a user;

generating, by the computing device, based on a location associated with the account, and based on the one or more name elements, one or more synthetic merchant names by:

providing, as input to a trained machine learning model, the one or more synthetic merchant names, wherein the trained machine learning model is trained to predict a believability of merchant names; and receiving, as output from the trained machine learning model, a predicted believability of the one or more synthetic merchant names;

generating, by the computing device and based on the one or more synthetic merchant names, synthetic transaction data that indicates a financial transaction conducted by the account and associated with at least one of the one or more synthetic merchant names;

generating, by the computing device and based on the synthetic transaction data, a synthetic authentication question; and providing the user device access to the account based on a response to the synthetic authentication question.

9. The method of claim 8, wherein generating the one or more synthetic merchant names comprises:

identifying the location associated with the account; and selecting, based on the location, at least one of the one or more name elements that corresponds to the location.

10. The method of claim 8, wherein generating the one or more synthetic merchant names comprises:

selecting a first name element of the one or more name elements that corresponds to a type of cuisine; and selecting, based on the type of cuisine, a second name element of the one or more name elements that corresponds to a first name or surname.

11. The method of claim 8, wherein the trained machine learning model is trained to predict the believability of merchant names based on tagged training data comprising the plurality of different real merchant names.

12. The method of claim 8, wherein generating the one or more synthetic merchant names is based on comparing the one or more synthetic merchant names to the plurality of different real merchant names.

13. The method of claim 8, wherein processing the plurality of different real merchant names to determine the one or more name elements comprises:

training a machine learning model to identify name elements by providing the machine learning model tagged data comprising a first portion of the plurality of different real merchant names;

providing, as input to the trained machine learning model, a second portion of the plurality of different real merchant names; and receiving, as output from the trained machine learning model, at least a portion of the one or more name elements.

14. The method of claim 8, wherein the one or more name elements comprise one or more of:

first names;

surnames;

geographical references; or indications of goods or services.

15. One or more non-transitory computer-readable media storing instructions that, when executed by one or more processors, cause a computing device to:

receive, from a merchants database, a plurality of different real merchant names;

process the plurality of different real merchant names to determine one or more name elements;

receive, from a user device, a request for access to an account associated with a user;

generate, based on the one or more name elements and based on a location associated with the account, one or more synthetic merchant names by:

providing, as input to a trained machine learning model, the one or more synthetic merchant names, wherein the trained machine learning model is trained to predict a believability of merchant names; and receiving, as output from the trained machine learning model, a predicted believability of the one or more synthetic merchant names;

generate, based on the one or more synthetic merchant names, synthetic transaction data that indicates a financial transaction conducted by the account and associated with at least one of the one or more synthetic merchant names;

generate, based on the synthetic transaction data, a synthetic authentication question; and provide the user device access to the account based on a response to the synthetic authentication question.

16. The non-transitory computer-readable media of claim 15, wherein the instructions, when executed by the one or more processors, cause the computing device to generate the one or more synthetic merchant names by causing the computing device to:

identify the location associated with the account; and select, based on the location, at least one of the one or more name elements that corresponds to the location.

17. The non-transitory computer-readable media of claim 15, wherein the instructions, when executed by the one or more processors, cause the computing device to generate the one or more synthetic merchant names by causing the computing device to:

select a first name element of the one or more name elements that corresponds to a type of cuisine; and select, based on the type of cuisine, a second name element of the one or more name elements that corresponds to a first name or surname.

18. The non-transitory computer-readable media of claim 15, wherein the trained machine learning model is trained to predict the believability of merchant names based on tagged training data comprising the plurality of different real merchant names.

19. The non-transitory computer-readable media of claim 15, wherein the instructions, when executed by the one or more processors, cause the computing device to generate the one or more synthetic merchant names based on comparing the one or more synthetic merchant names to the plurality of different real merchant names.

20. The non-transitory computer-readable media of claim 15, wherein the instructions, when executed by the one or more processors, cause the computing device to process the plurality of different real merchant names to determine the one or more name elements by causing the computing device to:

train a machine learning model to identify name elements by providing the machine learning model tagged data comprising a first portion of the plurality of different real merchant names;

provide, as input to the trained machine learning model, a second portion of the plurality of different real merchant names; and receive, as output from the trained machine learning model, at least a portion of the one or more name elements.

\* \* \* \* \*